United States Patent
Sriraman et al.

(10) Patent No.: US 12,330,304 B2
(45) Date of Patent: Jun. 17, 2025

(54) OBJECT PLACEMENT

(71) Applicant: Intrinsic Innovation LLC, Mountain View, CA (US)

(72) Inventors: Abhishek Sriraman, Union City, CA (US); Ajinkya Jain, San Jose, CA (US); John Carter Wendelken, Oakland, CA (US)

(73) Assignee: Intrinsic Innovation LLC, Mountain View, CA (US)

( * ) Notice: Subject to any disclaimer, the term of this patent is extended or adjusted under 35 U.S.C. 154(b) by 190 days.

(21) Appl. No.: 18/105,178

(22) Filed: Feb. 2, 2023

(65) Prior Publication Data

US 2023/0241771 A1    Aug. 3, 2023

Related U.S. Application Data (60) Provisional application No. 63/305,864, filed on Feb. 2, 2022.

(51) Int. Cl.
   *B25J 9/16*      (2006.01)
   *G05B 19/4155*   (2006.01)

(52) U.S. Cl.
   CPC .............. *B25J 9/163* (2013.01); *B25J 9/1697* (2013.01); *G05B 19/4155* (2013.01); *B25J 9/1664* (2013.01); *G05B 2219/39008* (2013.01); *G05B 2219/39484* (2013.01); *G05B 2219/40053* (2013.01); *G05B 2219/40564* (2013.01); *G05B 2219/45063* (2013.01); *G05B 2219/50391* (2013.01)

(58) Field of Classification Search
   CPC ........ B25J 9/163; B25J 9/1664; B25J 9/1697; G05B 19/4155; G05B 2219/39008; G05B 2219/39484; G05B 2219/40053; G05B 2219/40564; G05B 2219/45063; G05B 2219/50391
   See application file for complete search history.

(56) References Cited

U.S. PATENT DOCUMENTS

2019/0337152 A1* 11/2019 Homberg ............... B25J 9/1697
2020/0032454 A1*  1/2020 Soidinsalo ............. D21H 17/25
(Continued)

FOREIGN PATENT DOCUMENTS

JP         7528939 B2 *   8/2024

OTHER PUBLICATIONS

International Preliminary Report on Patentability in International Appln. No. PCT/US2023/012231, dated Aug. 6, 2024, 7 pages.
(Continued)

*Primary Examiner* — Thomas E Worden
*Assistant Examiner* — Jay Khandpur
(74) *Attorney, Agent, or Firm* — Fish & Richardson P.C.

(57) ABSTRACT

Methods, systems, and apparatus, including computer programs encoded on computer storage media, for performing planning for robotic placement tasks. One of the methods includes determining an initial in-hand state for a grasped object. A show pose for the grasped object is determined, and the object is moved to the show pose. A refined in-hand state for the grasped object is determined based on the show pose, and a placement plan is determined based on the refined in-hand state for the grasped object.

20 Claims, 8 Drawing Sheets

(56) References Cited

U.S. PATENT DOCUMENTS

| | | |
|---|---|---|
| 2020/0171655 A1* | 6/2020 | Lin ................. B25J 9/1612 |
| 2021/0086364 A1 | 3/2021 | Handa et al. |
| 2021/0291366 A1 | 9/2021 | Eto et al. |
| 2021/0347051 A1 | 11/2021 | Ye et al. |
| 2021/0387333 A1 | 12/2021 | Diankov et al. |
| 2022/0009091 A1* | 1/2022 | Moreno Noguer .... B25J 9/1612 |
| 2023/0129598 A1* | 4/2023 | Harmon ................ A61K 31/00 |
| | | 514/292 |

OTHER PUBLICATIONS

International Search Report and Written Opinion in International Appln. No. PCT/US2023/012231, dated Jun. 1, 2023, 10 pages.

Pfanne et al., "Fusing Joint Measurements and Visual Features for In-Hand Object Pose Estimation," IEEE Robotics and Automation Letters, Oct. 2018, 3(4):3497-3504.

* cited by examiner

OBJECT PLACEMENT

CROSS-REFERENCE TO RELATED APPLICATION

This application claims the benefit under 35 U.S.C. § 119(e) of the filing date of U.S. Provisional Patent Application No. 63/305,864, filed on Feb. 2, 2022, entitled "System and Method for Object Placement," the entirety of which is herein incorporated by reference.

TECHNICAL FIELD

This invention relates generally to the object placement field, and more specifically to a new and useful system and method in the object placement field.

BACKGROUND

This specification relates to robotics, and more particularly to planning robotic movements.

Robotics planning refers to scheduling the physical movements of robots in order to perform tasks. For example, an industrial robot that builds cars can be programmed to first pick up a car part and then weld the car part onto the frame of the car. Each of these actions can themselves include dozens or hundreds of individual movements by robot motors and actuators.

Robotics planning has traditionally required immense amounts of manual programming in order to meticulously dictate how the robotic components should move in order to accomplish a particular task. Manual programming is tedious, time-consuming, and error prone. Moreover, manually programming is brittle and is general not robust to small changes in the operating environment.

BRIEF DESCRIPTION OF THE DRAWINGS

Like reference numbers and designations in the various drawings indicate like elements.

DETAILED DESCRIPTION

This specification describes how a system can automatically refine a placement plan by refining in-hand pose estimates of objects that are held by an end effector. To do so, the system can generate a show pose that specifies how an object should be shown to a sensor, e.g., a camera.

The following description of embodiments of the invention is not intended to limit the invention to these embodiments, but rather to enable any person skilled in the art to make and use this invention.

1. Overview

Figure 1:
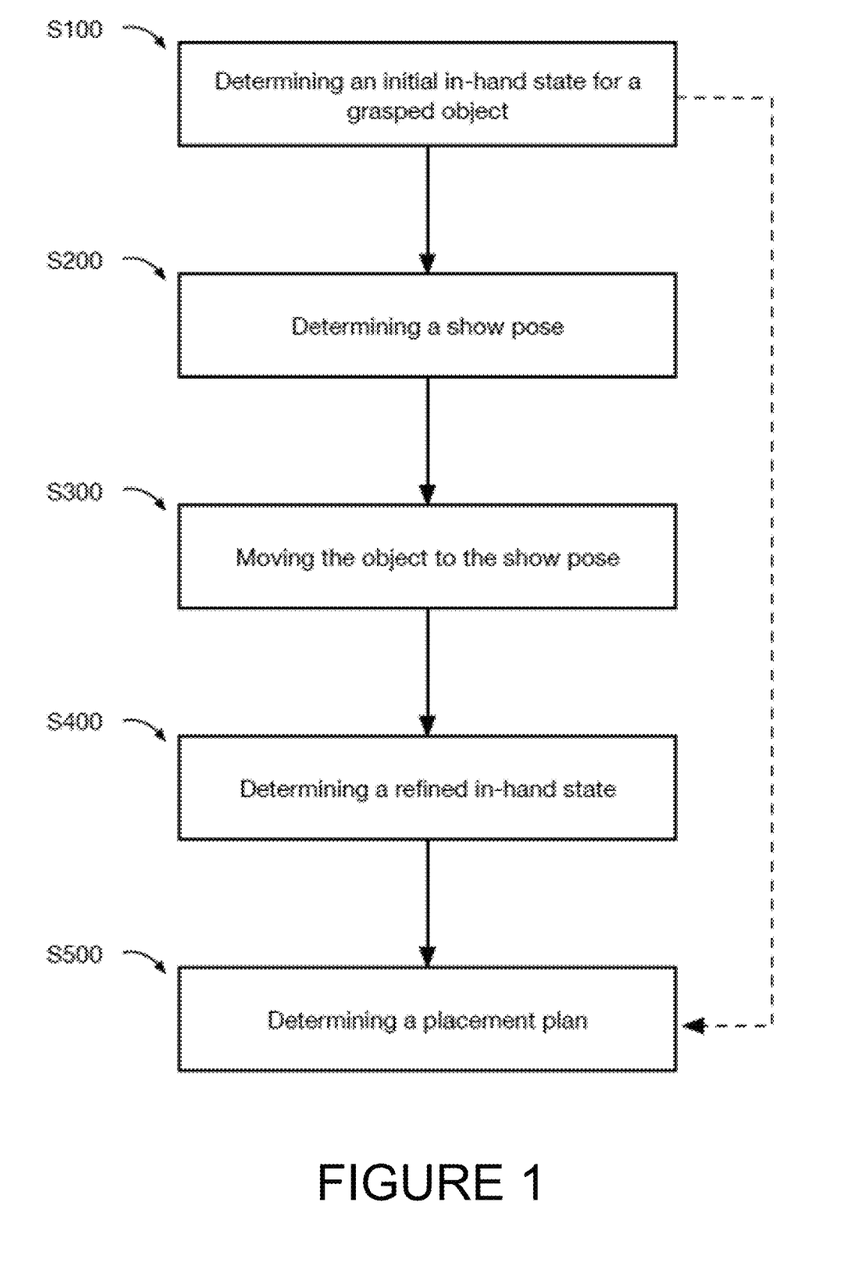
FIG. 1 is a flowchart representation of the method.

As shown in FIG. 1, the method for object placement can include: determining an initial in-hand state for a grasped object S100, determining a show pose S200, moving the object to the show pose S300, determining a refined in-hand state S400, and determining a placement plan S500. However, the method can additionally and/or alternatively include any other suitable elements.

One or more variations of the system and/or method can omit one or more of the above elements and/or include a plurality of one or more of the above elements in any suitable order or arrangement. In an illustrative example, the method can include: determining an initial estimate of the in-hand state (e.g., post-grasp pose) of a to-be-grasped object based on the object's to-be-grasped state (e.g., the to-be-grasped object's pose) and, optionally, the end effector's grasp pose; determining a show pose based on the initial in-hand pose; optionally determining a placement plan based on the initial in-hand pose; moving the grasped object to the show pose using the robot arm; determining a refined in-hand pose using validation measurements captured at the show pose; and selectively executing the placement plan based on a comparison between the initial in-hand pose and the refined in-hand pose.

2. Technical Advantages

The system and method for object placement can confer several benefits over conventional methods.

First, the technology can increase placement accuracy by determining the refined pose of the grasped object within the end effector (e.g., in-hand pose). This technology can be particularly useful in tight-fit insertion applications (e.g., a tight tolerance insertion task, when insertion tolerance is low, etc.). For example, the refined in-hand pose can be determined by updating the initial in-hand pose using one or more validation measurements sampled at an informative show pose.

Second, variants of the technology can pre-plan a placement path based on an initial in-hand pose and execute the pre-planned placement path when the refined in-hand pose is substantially similar to the initial in-hand pose. This can enable the grasped object to be placed without pausing for placement path planning after refined in-hand pose determination, thereby increasing speed of placement. For example, the object can be placed by executing the pre-planned placement plan when the refined in-hand pose is substantially similar to the initial in-hand pose.

Third, in variants of the technology, a secondary camera (e.g., directed away from the bin) can be used to collect in-hand validation images to minimize issues from background clutter from the bin and/or container.

However, the system and method can confer any other suitable benefits.

3. System

Figure 2:
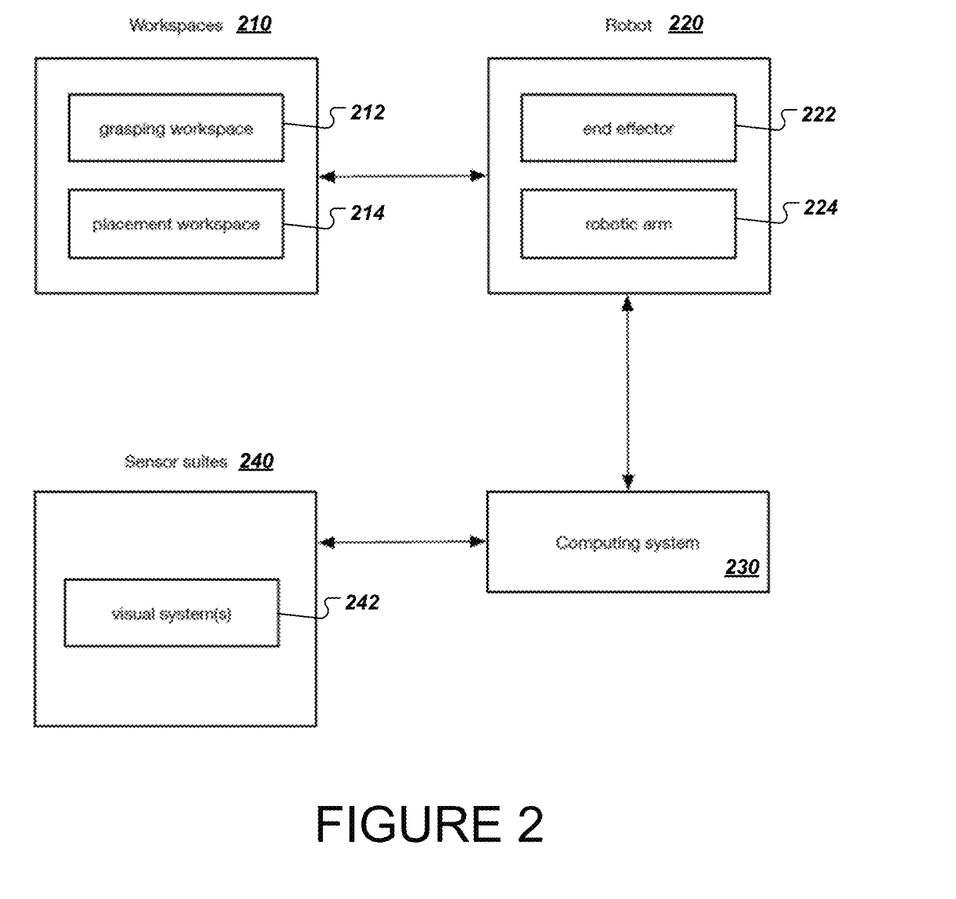
FIG. 2 is a schematic representation of a variant of the system.

The method can be performed using a system of one or more computers in one or more locations (an example of which is shown in FIG. 2) including one or more: workspaces 210, robots 220, sensor suites 240, computing systems 230, and/or any other suitable components.

Figure 3:
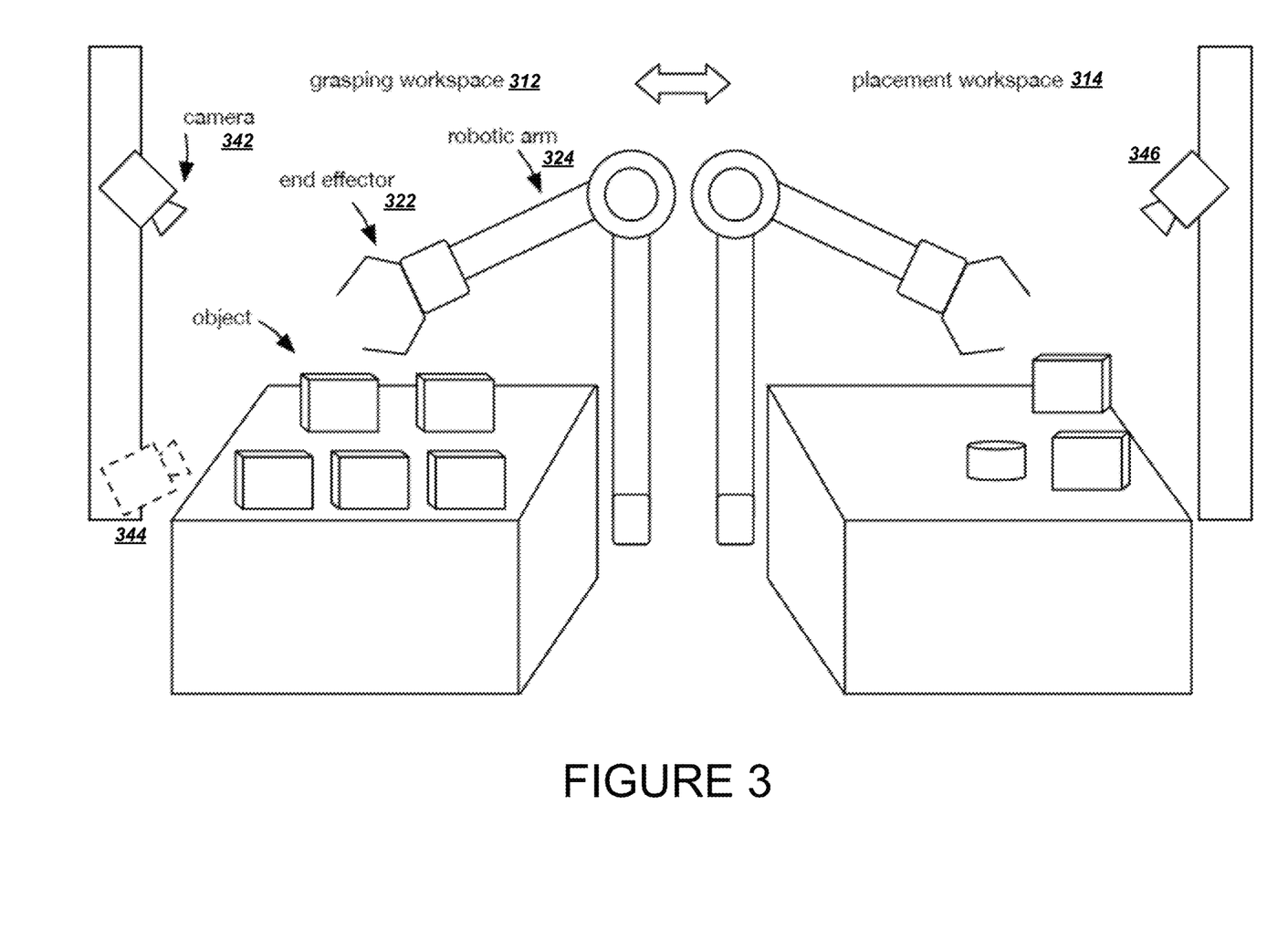
FIG. 3 is an illustrative example of a variant of the system.

The one or more workspaces function to define the volume that can be reached by the end effector 222 and/or robotic arm 224 of the robot 220. The workspace can be physical or virtual. In variants, the workspaces can include: a grasping workspace 212 (e.g., grasp region that can be reached by the end effector and/or robotic arm) a placement workspace 214 (e.g., placement region that can be reached by the end effector and/or robotic arm), and/or any other suitable workspace type; an example of which is shown in FIG. 3.

Each workspace can include: an object set (e.g., overlapping objects, a pile of objects, non-overlapping objects, etc.), containers (e.g., bins, etc.), conveyors, sensors (e.g., oriented toward the object set), and/or other components.

The robot 220 functions to manipulate an object. The robot 220 can include an end effector 222, a robotic arm 224, and/or other components.

The sensor suite 240 functions to sample measurements of the scene within each workspace and/or any other suitable environment. Sensors within a sensor suite can include: visual systems 242 (e.g., cameras, depth sensors, RGB sensors, projected light systems, TOF systems, etc.), acoustic sensors, actuation feedback systems, probes, and/or any other suitable sensors. Each workspace can include one or more sensor suites. Sensors can be mounted within each workspace (e.g., above, below, to the side, oriented upward at an angle, oriented downward at an angle, etc.), mounted to the robot (e.g., robotic arm, end effector, etc.), mounted to a superstructure (e.g., on a conveyor belt, above a picking bin/container, camera directed toward a picking bin/container, etc.), integrated into the robot (e.g., robotic arm, end effector, etc.), and/or otherwise suitably arranged. Sensors can be arranged into sensor sets and/or not arranged in sets. The system preferably includes one or more sensors for each workspace, but can alternatively include any suitable number of sensors for each workspace. In a first variation, a workspace includes a single sensor suite used for planning (e.g., grasp planning) and in-hand pose confirmation. In a second variation, a workspace includes a primary sensor suite used for planning and an auxiliary sensor suite used for in-hand pose confirmation. In this variation, the primary sensor suite can be oriented toward a set of objects to-be-grasped, while the auxiliary sensor suite can be oriented away from, or at a different angle to the set of objects to-be-grasped (e.g., to minimize background clutter, etc.). The auxiliary sensor suite's field of view (FOV) can overlap or be distinct from the primary sensor suite's FOV. The object's in-hand pose can be validated based on multiple perspectives (e.g., cross-validated, validated using stereovision methods, fused, etc.) when the FOVs overlap. Alternatively, the overlapping measurements can be otherwise used. However, the one or more sensor suites can be otherwise configured.

The computing system 230 functions to perform one or more steps of the method, but can additionally and/or alternatively provide any other suitable functionality. The computing system can be local to the robot, remote, and/or otherwise located. The computing system can include one or more: object detectors configured to detect object instances and determine each object's pose (e.g., trained using the methods discussed in U.S. application Ser. No. 17/375,356 filed 14 Jul. 2021, incorporated in its entirety by this reference, etc.), grasp planners configured to plan a grasp given a to-be-grasped object's pose (e.g., using methods discussed in U.S. application Ser. No. 17/375,798 filed 14 Jul. 2021, U.S. application Ser. No. 17/375,424 filed 14 Jul. 2021, U.S. application Ser. No. 17/375,923 filed 14 Jul. 2021, each of which incorporated in their entireties by this reference; other grasp planners; etc.), show pose planners configured to determine show pose parameters (e.g., the show pose itself, when validation measurements should be sampled, etc.) for the in-hand (grasped) object, a placement planner configured to plan a placement path (e.g., from the show pose or the grasp pose to a placement pose), and/or other modules.

However, the computing system can be otherwise configured.

FIG. 3 illustrates an example system. The example system includes a grasping workspace 312 and a placement workspace 314. A robot having a robotic arm 324 and an end effector 322 moves objects from the grasping workspace 312 to the placement workspace 314. After grasping an object in the grasping workspace 312, the system uses a camera 342 to refine the in-hand pose of the grasped object. This allows the robot to place the object much more accurately in the placement workspace 314, particularly when the grasping workspace is noisy, cluttered, or has difficult lighting conditions for object or pose detection. The system can optionally include another camera 344 in the grasping workspace 312, another camera 346 in the placement workspace 346, or some combination of these.

4. Method

The method can include: determining an initial in-hand state for a grasped object S100, determining a show pose S200, moving the object to the show pose S300, determining a refined in-hand state S400, and determining a placement plan S500, and/or any other suitable elements.

The method functions to increase the accuracy of object placement of a grasped object. In variants, this can be particularly useful when the allowable tolerance for object placement is small (e.g., in tight fit applications, transition fit applications, etc.). The method is preferably performed by the system disclosed above, but can additionally and/or alternatively be performed by any other suitable system. The method can be performed once, iteratively, repeatedly, periodically, and/or otherwise performed. The object can be: rigid, deformable, matte, transparent, reflective, and/or have any other suitable property. The object can be: cylindrical, rectangular, and/or any other suitable shape. Object examples include: a container, a toy (e.g., plush, metal, plastic, etc.), and/or any other suitable object. The object can include one or more components: lids, compartments, parts, and/or any other suitable component.

4.1. Determining an Initial In-Hand State for a Grasped Object S100

Determining an initial in-hand state for a grasped object S100 functions to determine a pose based on the grasp of an object. The object is preferably grasped by an end effector from an object set (e.g., from a pile of object instances, from a cluttered grasp environment, etc.), but can additionally and/or alternatively be grasped by an end effector from a conveyor belt, grasped by any other suitable component, and/or otherwise grasped. The state (e.g., initial and/or refined state) of the grasped object can include: pose, position, orientation, principal axes, bounding boxes, parameters, and/or any other suitable representation of the object.

In a first variant, an initial in-hand pose of a grasped object can be fixed and predetermined (e.g., based on uniform planned grasp, based on the known or assumed state of the to-be-grasped object, etc.).

In a second variant, an initial in-hand pose of a grasped object can be determined (e.g., calculated, inferred) based on the pose of the to-be-grasped object and the end effector's grasp pose (e.g., relative to the to-be-grasped object while grasping). The end effector's pose can be determined from grasp planning, joint states, and/or otherwise determined. The pose of the to-be-grasped object can be determined by an object detector and/or otherwise determined. For example, the object detector is trained to predict the object's pose based on an image or depth measurement. The object detector can be a neural network (e.g., CNN), a graphical model (e.g., RCN, Bayesian network, etc.), a logistic regression, a clustering algorithm, and/or any other suitable feature detector. In specific examples, the object detector can leverage one or more of the architectures disclosed in U.S. application Ser. No. 17/375,331 filed on 14 Jul. 2021 or U.S. application Ser. No. 17/375,356 filed on 14 Jul. 2021 each of which are incorporated in their entireties by this reference.

However, the initial in-hand pose of the grasped object can be otherwise determined.

4.2. Determining a Show Pose S200

Figure 7A:
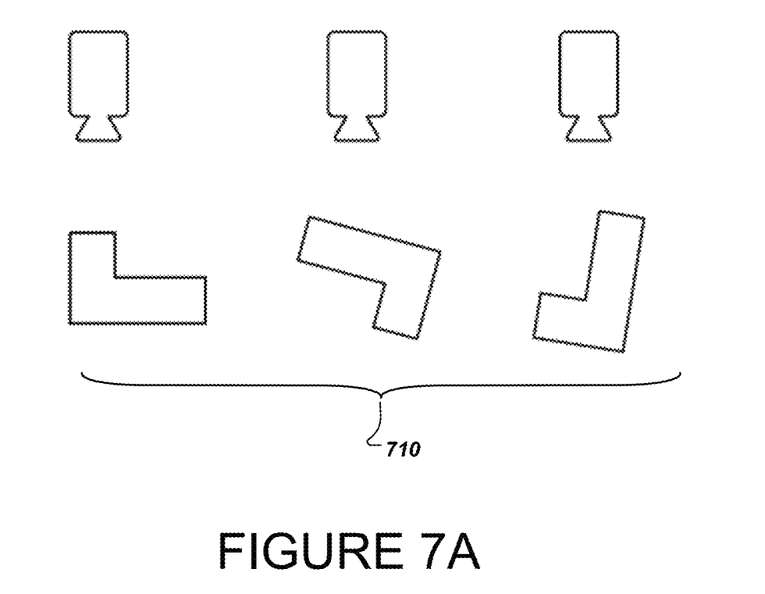
FIG. 7A is an illustrative example of show poses without using initial object pose estimation.
Figure 7B:
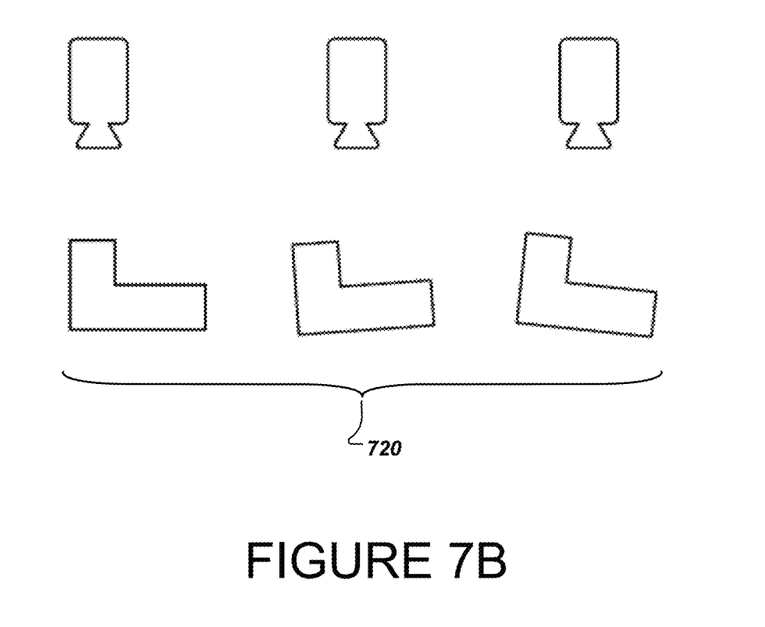
FIG. 7B is an illustrative example of show poses using initial object pose estimation.

Determining a show pose S200 functions to increase the accuracy of the state estimate of the grasped object by obtaining validation measurements based on a set of criteria. In variants, the show pose can be informative, and be used to determine a refined or improved estimate of the in-hand state of the grasped object. In examples, the variance of the show pose across different validation measurements (e.g., for different object instances) can be minimized by using the initial object pose estimates (e.g., to plan a trajectory to arrive at a more consistent show pose, example shown in FIG. 7B). This can be an improvement over other approaches that do not use initial object pose estimates. For example, the variance of the show poses 710 in FIG. 7A is higher than the show poses 720 in FIG. 7B. This lower variance can improve object pose estimation or validation and/or confer other benefits.

Figure 5A:
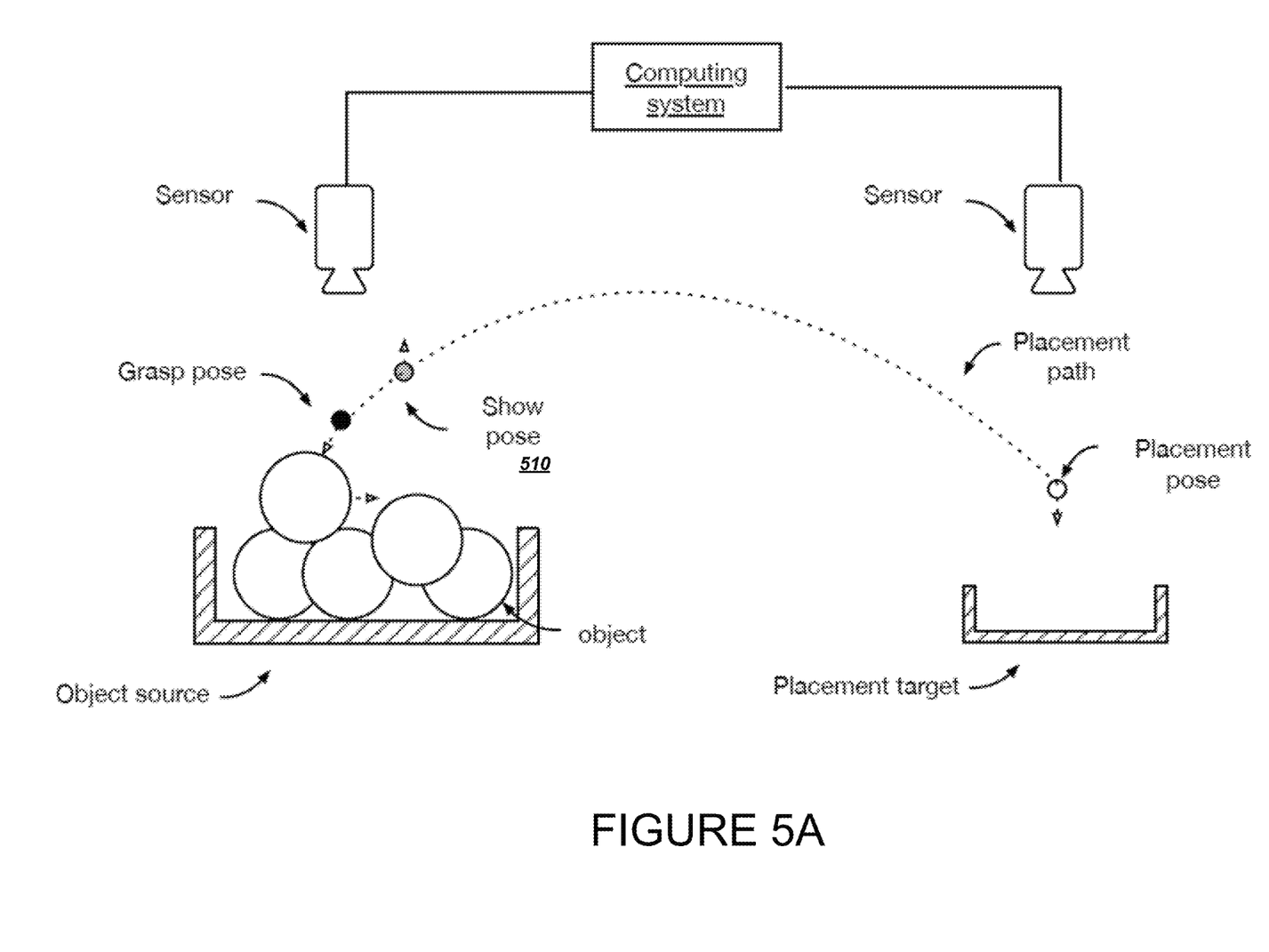
FIG. 5A is an illustrative example of a grasping and placement workspace with a show pose determined based on the placement path.
Figure 5B:
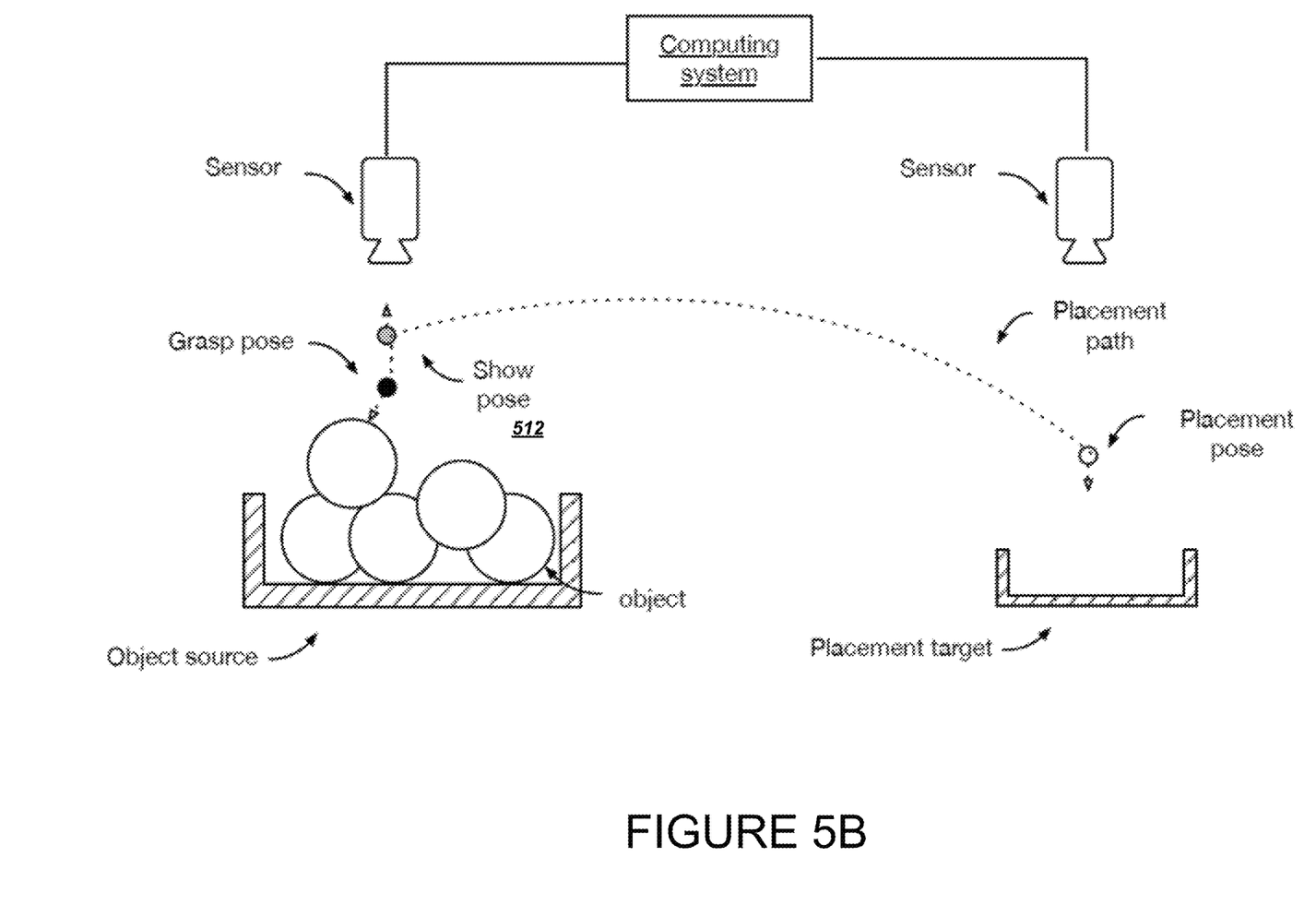
FIG. 5B is an illustrative example of a grasping and placement workspace with an independently-determined show pose.

The set of criteria can include: the object is not self-occluded, defining features are visible, end effector features (e.g., Aruco markers on the end effectors) are visible, the object is not occluded by shadows, object's primary axis is not directly aligned with the sensor's measurement axis (e.g., camera focal axis), and/or any other suitable criteria. S200 can determine one or more show poses. The show pose can be: a set of predetermined poses relative to the sensor suite (e.g., relative to a camera) and/or the grasp pose (e.g., offset from the placement trajectory; example shown in FIG. 5B), an object pose estimated to occur along the trajectory planned between the grasp pose and the placement pose (e.g., an intermediate waypoint along the placement trajectory; example shown in FIG. 5A), and/or be any other show pose. For example, in FIG. 5A, the show pose 510 is at an intermediate waypoint along the placement trajectory, while in FIG. 5B, the show pose 512 is at an offset, e.g., directly above, from the initial grasp pose. The show pose can be an object pose relative to the validation sensor, an end effector pose relative to the validation sensor, and/or the pose of any other component relative to the validation sensor. The validation sensor can be a sensor used to identify the grasp target, be the auxiliary sensor, be a sensor located along the placement trajectory, and/or be any other sensor. S200 can be performed: concurrently with grasp planning, after the grasp has been executed, and/or at any other time.

In a first variant, the show pose can be fixed and predetermined. In a first example, the show pose can be a predetermined set of end effector poses relative to the validation sensor (e.g., wherein the set of end effector poses enable the validation sensor to sample a threshold number of grasped object viewpoints). In a second example, the show pose can be a predetermined end effector pose relative to the grasp pose. In an illustrative example, the show pose can be a predetermined end effector vertical retraction from the grasp pose. In a third example, the show pose can be a predetermined pose for the end effector relative to the validation sensor. In a fourth example, the show pose can be a physical region where the object set is not in the background.

In a second variant, the show pose can be determined based on the initial in-hand pose. In a first example, a set of predetermined show poses can be predetermined for each of a set of potential in-hand poses or range thereof, wherein S200 includes selecting the predetermined show pose associated with the initial in-hand pose or range thereof. In a second example, a set of predetermined show poses is determined for the object (e.g., based on the object geometry). For example, for a linear object, the set of show poses can be perpendicular to the object's primary axis. In a third example, the show pose can be dynamically calculated based on the initial in-hand pose (e.g., determined by an object-specific or generic model). For example, the show pose can be determined based on an optimization (e.g., across an estimated validation confidence level, the amount of time to achieve the show pose, and/or other parameters). In a fourth example, the show pose can be determined based on the estimated object poses relative to the validation sensor along the placement trajectory. In an illustrative example, this can include: determining the placement trajectory (e.g., from the grasp pose to a placement pose or workspace), estimating the object poses (show poses) relative to the validation sensor at each of a set of trajectory positions along the placement trajectory based on the initial in-hand pose, and selecting the trajectory positions corresponding to desired object poses (e.g., with high validation confidence). The desired show poses can be determined using the methods discussed above, the second variant of S200, the show poses satisfying the set of criteria, and/or otherwise determined.

In a third variant, the show pose can be determined for a particular vision algorithm. For example, some pose detection algorithms work more effectively when certain objects are viewed from certain angles. An example is determining the pose of a coffee mug, in which the pose can be more accurately determined if the handle is visible than if the handle is obscured. Thus, the show pose can be determined based on the settings for a particular vision algorithm in order to improve the accuracy of the vision algorithm. This process can include determining an axis of an object that should be within the vision plane of the sensor as opposed to orthogonal to it. As one example, a show pose for a pencil can be generated that places the pencil to lie within the vision plane of a camera system to prevent the pencil from being viewed head-on by the camera system.

However, the show pose can be otherwise determined.

S200 can optionally include determining a show pose plan. Determining a show pose plan functions to plan a path from the grasp pose to the show pose, and optionally plan another path from the show pose to the placement pose. The show pose plan can be determined after the object is selected for grasp, determined after grasp execution, be determined after the show pose is determined, be predetermined, and/or otherwise determined.

In a first variant, determining a show pose plan can include calculating a path plan to move from the grasp pose to the show pose, and optionally between series of show poses.

In a second variant, the show pose plan can be predetermined (e.g., be a predetermined set of joint motions).

However, the show pose plan can be otherwise determined.

4.3. Moving the Object to the Show Pose S300

Moving the object to the show pose S300 functions to control a robotic arm and/or end effector to move an object within the end effector based on a plan.

In a first variant, S300 can include executing a show pose plan. For example, the robotic arm can be moved to position the object in different poses (e.g., show poses) under a single camera.

In a second variant, S300 can include executing a placement plan. For example, the show pose can be selected from a set of object poses appearing along a placement trajectory.

However, S300 can be otherwise performed.

4.4. Determining a Refined In-Hand State S400

Determining a refined in-hand state S400 functions to determine a refined in-hand pose of the object and/or verify the initial in-hand pose of the object.

S400 can include: sampling validation measurements of the in-hand object at the show pose and determining the refined in-hand pose based on the validation measurements. However, S400 can be otherwise performed.

Validation measurements can include: images of the grasped object in the show pose, depth measurements, physical measurements (e.g., determined by inserting the grasped object into a mold, physically probing the grasped object, and determining the refined in-hand pose based on the probe results), and/or any other suitable measurements. Validation measurements can be sampled by the sensor suite in the grasping workspace (e.g., used to determine which object to grasp), the sensor suite in the placement workspace (e.g., used to detect and/or track the placement target), a separate validation sensor, and/or any other suitable sensor. Validation measurements are preferably sampled when the in-hand object is in the show pose, but can additionally and/or alternatively be sampled in any other suitable pose.

Determining the refined in-hand pose based on the validation measurements can include: determining an object pose from the validation measurements, determining the end effector pose, and calculating the refined in-hand pose based on the object pose and the end effector pose.

The object pose is preferably determined using an object detector, but can be otherwise determined. The object detector can be the same as that used to identify the object to grasp, but can alternatively be a different model.

In a first embodiment, determining an object pose based on the validation measurement can include determining an object pose from the poses of known keypoints identified within the validation measurements by an object detector. The object detector can determine the object pose by using a base method (e.g., perspective-n-point (PNP) applied to all predicted keypoints), a visibility-based method (e.g., PNP applied to visible keypoints), normals-based method (e.g., weighted PNP applied to visible keypoints with weights determined according to the angle between the surface normal of the nearest mesh point and the camera direction), RANSAC method (e.g., PNP with a RANSAC algorithm), and/or any other suitable method. The keypoints can be distinct object features (e.g., edges, corners, etc.), synthetic keypoints, and/or any other keypoint. The object detector can be trained to determine: a set of keypoints (e.g., where each keypoint can be associated with a known pose or set thereof), a set of keypoint heatmaps (e.g., probability distribution for each of a set of keypoints over a spatial region), object face identifiers, estimated surface normals, object orientation, and/or any other suitable output. The model can be trained using a method disclosed in U.S. application Ser. No. 17/375,331 filed on 14 Jul. 2021 and/or U.S. application Ser. No. 17/375,356 filed on 14 Jul. 2021, each of which are incorporated in their entireties by this reference, but can be otherwise trained. When a set of keypoint heatmaps is determined, the heatmaps can be converted to a set of distinct keypoints for a subsequent object pose determination. In examples, the keypoint can be: estimated to be located at the respective heatmap's the global maximum (e.g., using smoothed, unsmoothed, weighted mean of the smoothed and unsmoothed heatmaps, etc.); selected from a set of candidate keypoints extracted for each heatmap (e.g., selected based on a smoothed heatmap); calculated from a set of candidate keypoints extracted from each heatmap (e.g., clustering the candidate keypoints and selecting a cluster centroid as the keypoint); selecting the keypoints that substantially match an object model's geometry (e.g., leads to the lowest reprojection error after computing the object pose via PNP); and/or be otherwise determined from the keypoint heatmaps.

In a second embodiment, determining an object pose based on the validation measurement can include estimating the geometric features (e.g., principal axis, secondary axis, tertiary axis, bounding box, aspect ratios, centroid, etc.) of the object. The resultant geometric model (e.g., bounding box) can be used to infer the object pose based on the geometric features, be used directly for placement planning, and/or otherwise used. The geometric model used to estimate the geometric features can be object-specific, generic to multiple objects, and/or otherwise configured.

For example, the geometric features can be estimated (e.g., from depth sensor output) by using a principal axis estimator. The principal axis estimator is preferably used with a single grasped object, but can additionally and/or alternatively be used with multiple grasped objects. The principal axis estimator can be used for single-view estimation (e.g., single end effector and/or single camera), multi-view estimation (e.g., multiple end effector positions and/or multiple cameras), and/or any otherwise used. The principal axis estimator can estimate the pose of the grasped object's principal axis using one or more validation measurements (e.g., depth images), the end effector pose information, prior scene input (e.g., mesh model of end effector, model of in-hand object, end effector pose, initial in-hand pose for the object, etc.), and/or any other suitable input. The inventors have discovered that when using principal axis estimation, a source of error (e.g., high probability that the refined in-hand pose will be poorly estimated) is caused by using a validation measurement with a single viewpoint of the object (e.g., the object is presented to the camera with its primary axis direction aligned with the camera direction, the object is self-occluded, the object point cloud used is an insubstantial representation of the full object, etc.) as an input. To solve this source of error, validation measurements preferably represent multiple viewpoints of the object (e.g., captured by multiple cameras at the same time, captured by one camera at multiple times, etc.), but can additionally and/or alternatively represent a single viewpoint of the object. The principal axis estimator can output a refined in-hand pose (e.g., of one or more geometric axes), principal axes (e.g., principal, secondary, and tertial axes as unit vectors, aspect ratios related to axis lengths), bounding boxes (e.g., three-dimensional size array), a quality metric, and/or any other suitable output.

In an illustrative example of the second embodiment, S400 can include constructing a point cloud from the validation measurement (e.g., using truncated signed distance fields (TSDF)), segmenting the in-hand object from the end effector and/or background, computing the geometric features from the object point cloud (and/or mesh generated therefrom), computing the refined in-hand pose from the geometric features (e.g., based on known object orientation relative to the measured geometric features), optionally resolving ambiguities using visual features and/or the initial in-hand pose, and/or otherwise used. The in-hand object can be segmented from the end effector and/or background by removing points with depths outside of the range of possible object depths, removing points associated with the end effector (e.g., determined by aligning an end effector model at the end effector pose with the point cloud), and/or otherwise segmented.

In a third embodiment, determining an object pose based on the validation measurement can include aligning a virtual model of the object to the validation measurement and determining the object pose from the model pose. The virtual model of the object can be aligned to the validation measurement based on: visual features, keypoints, geometric features, and/or otherwise aligned.

Alternatively, the refined in-hand pose can be determined based on whether the in-hand object pose matches the show pose (e.g., whether certain object features appear within the validation measurement).

However, the object pose can be otherwise determined.

Determining an end effector pose based on the validation measurement can include using a model trained to detect end effector visual features (e.g., Aruco markers statically fixed to the end effector) and/or keypoints with known poses on the object, inferring an end effector pose from joint configuration, and/or otherwise determined. Calculating a refined in-hand pose based on the object pose and the end effector pose can include transforming the object pose in the validation reference frame into the end effector reference frame based on the end effector pose, or otherwise determined.

However, the refined in-hand pose can be otherwise determined.

Figure 4:
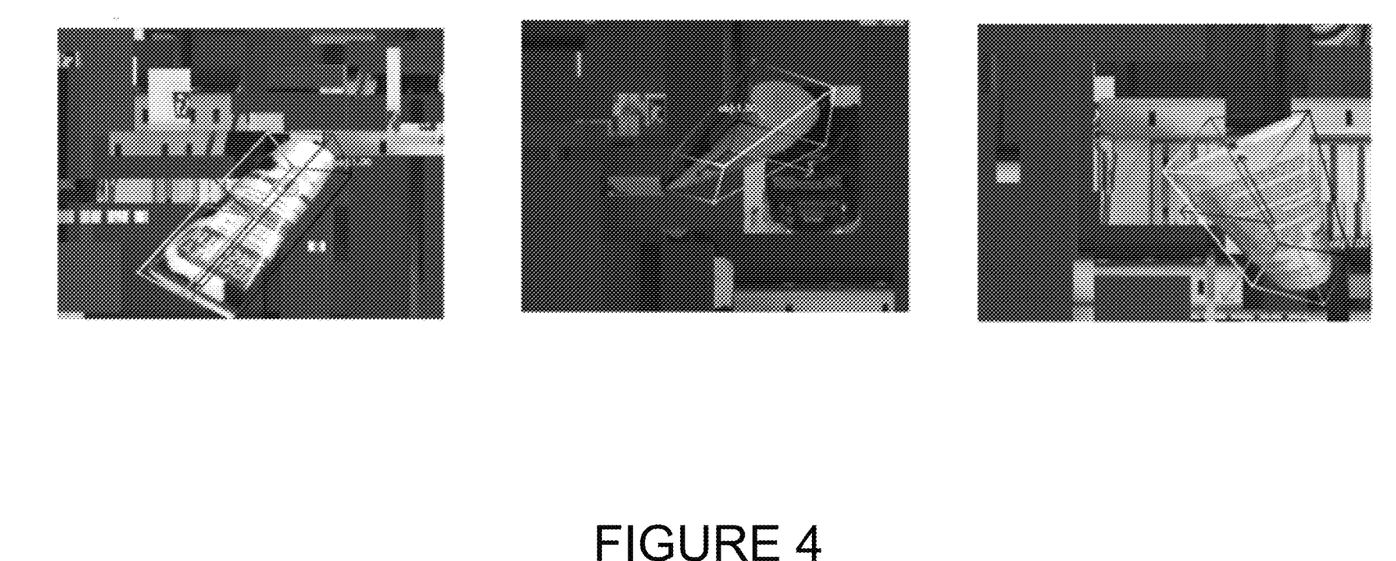
FIG. 4 is an illustrative example of training images with conveyor backgrounds.

S400 can optionally include training a model (e.g., the object detector) to determine a refined in-hand pose. The model is preferably trained before method execution, but can additionally and/or alternatively be trained during method execution and/or any other suitable time. The training data is preferably pre-processed (e.g., depth refinement, specularity manipulation, blur manipulation, augmentation), but can alternatively not be pre-processed. The training data (e.g., images) can include conveyor backgrounds (example shown in FIG. 4), natural backgrounds, backgrounds that are similar to the test environment's background, backgrounds dissimilar from the test environment's background, and/or any other suitable backgrounds. FIG. 4 for example illustrates three different images of different object poses with environment backgrounds, which can be used as training data.

The training data is preferably labelled with ground-truth poses (e.g., determined through image annotation and/or consensus multiview estimation), but can additionally and/or alternatively not be labelled with ground-truth poses. The training data can include: simulated images of different in-hand poses, real images of different in-hand poses, images with simulated backgrounds, images with real backgrounds, uniformly sampled random in-hand poses with a reference object-to-camera distance, in-hand poses sampled with a gaussian distribution around a collection of in-poses obtained from real data, training data from normal-based in-hand pose simulation (e.g., simulate suction grasp at every vertex normal), training data from shape-based in-hand pose simulation (e.g., simulate grasp uniformly on selected surfaces of a primitive shape), and/or any other suitable training data.

In a first variant, the model can be trained to identify keypoint locations (and/or probabilities thereof) within the training data.

In a second variant, the model can be trained to output a matrix of the refined in-hand pose.

However, the model can be otherwise trained.

4.5. Determining a Placement Plan S500

Determining a placement plan S500 functions to determine a placement path for the object. The placement plan can be determined based on the initial in-hand pose, the refined in-hand pose, be a predetermined plan, and/or be determined based on any other information. S500 can be performed: concurrently or after S100, before, after, or concurrently with S400, repeated, and/or any other suitable time. One or more placement plans can be determined for a given grasped object.

Figure 6:
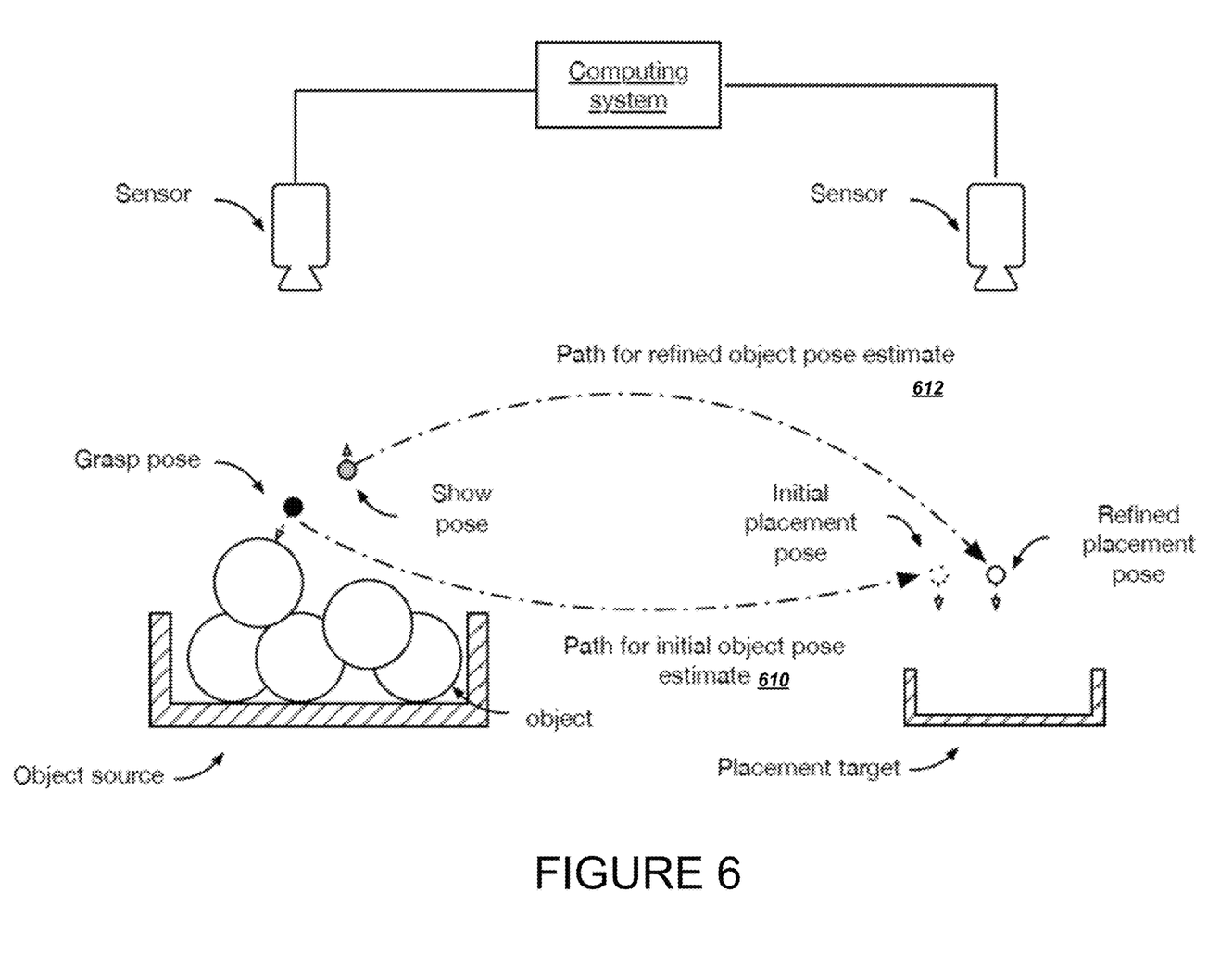
FIG. 6 is an illustrative example of which in-hand poses are used to determine the initial and refined placement poses.

In a first variant, the placement plan (and/or placement pose) is determined based on the initial in-hand pose (e.g., the placement plan is preplanned, independent of the refined in-hand pose). In this variant, the pre-planned placement plan and/or placement pose can be used when the refined in-hand pose is substantially similar to the initial in-hand pose, and discarded when the refined in-hand pose is not substantially similar to the initial in-hand pose; examples shown in FIG. 6. In FIG. 6, the path for the initial object pose estimate 610 can be discarded for a path for the refined object pose estimate 612 if the refined in-hand pose is not substantially similar to the initial in-hand pose. Whether the poses are substantially similar can be computed according to any appropriate distance metric.

Discarding a pre-planned placement plan can include: planning a new placement plan based on the refined in-hand pose, updating the pre-planned placement plan, discarding the grasped object (e.g., dropping the grasped object back into the original bin and/or another bin designated for discarded grasped objects), and/or otherwise discarded. The similarity between the initial and refined in-hand poses can be determined: based on a comparison metric, an error metric, and/or otherwise determined. Examples of comparison metrics can include: a physical distance (e.g., outside of angular range, outside of physical range, etc.); a vector distance; and/or any other metric. Examples of error metrics can include: a translation error, a rotation error, an average axis alignment error (e.g., angular difference between corresponding axes without regard to direction and average across all three axes), a primary axis alignment error (e.g., angular difference between corresponding axes without regard to direction for primary axis), and/or any other suitable error metric.

In a second variant, the placement plan is determined by updating the pre-planned placement plan based on the difference between the refined in-hand pose and the initial in-hand pose. The pre-planned placement plan can be updated by updating a placement plan component associated with the differing pose parameter and/or otherwise updated.

In a third variant, the placement plan can be determined by calculating a placement plan based on a refined in-hand pose. The placement plan can be calculated de novo, calculated by using a model (e.g., regression), and/or otherwise calculated.

However, the placement plan can be otherwise determined.

S500 can optionally include executing the placement plan. Executing the placement plan functions to place the grasped object into a placement. Executing the placement plan is preferably performed after S500, but can additionally and/or alternatively be performed before S500, concurrently with S500, and/or any other suitable time. The placement plan is preferably executed by the robot, but can additionally and/or alternatively be executed by the computing system and/or any other suitable component.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

In addition to the embodiments described above, the following embodiments are also innovative:

Embodiment 1 is a method performed by one or more computers, the method comprising:
   determining an initial in-hand state for a grasped object;
   determining a show pose for the grasped object;
   moving the object to the show pose;
   determining a refined in-hand state for the grasped object; and
   determining a placement plan based on the refined in-hand state for the grasped object.

Embodiment 2 is the method of embodiment 1, wherein determining the initial in-hand state for the grasped object comprises determining an initial estimate of the in-hand state of a to-be-grasped object based on the object's to-be-grasped state.

Embodiment 3 is the method of any one of embodiments 1-2, wherein determining the initial in-hand state for the grasped object comprises uses a predetermined in-hand state.

Embodiment 4 is the method of any one of embodiments 1-3, wherein determining the show pose for the grasped object comprises determining the show pose based on the initial in-hand pose.

Embodiment 5 is the method of any one of embodiments 1-4, wherein determining the show pose for the grasped object comprises determining the show pose for a particular vision algorithm.

Embodiment 6 is the method of any one of embodiments 1-5, wherein determining the refined in-hand state comprises determining a refined in-hand pose using validation measurements captured at the show pose.

Embodiment 7 is the method of any one of embodiments 1-6, wherein determining the refined in-hand state comprises capturing sensor data of the object at the show pose and using a machine learning model to generate a refined in-hand pose.

Embodiment 8 is the method of any one of embodiments 1-7, further comprising executing the placement plan based on a comparison between the initial in-hand pose and the refined in-hand pose.

Embodiment 9 is the method of any one of embodiments 1-8, wherein determining the placement plan comprises updating a pre-planned placement plan based on a difference between the refined in-hand state and the initial in-hand state.

Embodiment 10 is the method of embodiment 9, wherein determining the placement plan comprises:
   determining that the difference between the refined in-hand state and the initial in-hand state is not substantially similar; and
   in response, discarding a pre-planned placement plan.

Embodiment 11 is the method of any one of embodiments 1-10, wherein determining the placement plan comprises computing a new placement plan based on the refined in-hand pose.

Embodiment 12 is a system comprising: one or more computers and one or more storage devices storing instructions that are operable, when executed by the one or more computers, to cause the one or more computers to perform the method of any one of embodiments 1 to 11.

Embodiment 13 is a computer storage medium encoded with a computer program, the program comprising instructions that are operable, when executed by data processing apparatus, to cause the data processing apparatus to perform the method of any one of embodiments 1 to 11.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A method performed by one or more computers in communication with a robot, the method comprising:
   providing one or more commands to the robot that cause the robot to grasp an object by an end effector of the robot;
   determining an initial in-hand state for the grasped object representing an initial pose of the grasped object relative to the end effector of the robot grasping the grasped object;
   determining a show pose for the grasped object relative to a sensor in the operating environment of the robot;
   moving, by the robot, the object to have the show pose in the operating environment;
   determining, using sensor data captured of the object in the show pose, a refined in-hand state for the grasped object representing a refined pose of the grasped object relative to the end effector of the robot;
   determining a placement plan based on the refined in-hand state of the grasped object; and
   providing one or more commands to the robot that cause the robot to place the grasped object according to the refined in-hand state of the grasped object.

2. The method of claim 1, wherein determining the initial in-hand state for the grasped object comprises determining an initial estimate of the in-hand state of a to-be-grasped object based on the object's to-be-grasped state.

3. The method of claim 1, wherein determining the initial in-hand state for the grasped object comprises using a predetermined in-hand state.

4. The method of claim 1, wherein determining the show pose for the grasped object comprises determining the show pose based on the initial in-hand pose.

5. The method of claim 1, wherein determining the show pose for the grasped object comprises determining the show pose for a particular vision algorithm.

6. The method of claim 1, wherein determining the refined in-hand state comprises determining a refined in-hand pose using validation measurements captured at the show pose.

7. The method of claim 1, wherein determining the refined in-hand state comprises capturing the sensor data of the object at the show pose and using a machine learning model to generate a refined in-hand pose.

8. The method of claim 1, further comprising executing the placement plan based on a comparison between the initial in-hand pose and the refined in-hand pose.

9. The method of claim 1, wherein determining the placement plan comprises updating a pre-planned placement plan based on a difference between the refined in-hand state and the initial in-hand state.

10. The method of claim 9, wherein determining the placement plan comprises:
    determining that the difference between the refined in-hand state and the initial in-hand state is not similar;
    and in response, discarding a pre-planned placement plan.

11. The method of claim 1, wherein determining the placement plan comprises computing a new placement plan based on the refined in-hand pose.

12. A system comprising: one or more computers and one or more storage devices storing instructions that are operable, when executed by the one or more computers in communication with a robot, to cause the one or more computers to perform operations comprising:
    providing one or more commands to the robot that cause the robot to grasp an object by an end effector of the robot;
    determining an initial in-hand state for the grasped object representing an initial pose of the grasped object relative to the end effector of the robot grasping the grasped object;
    determining a show pose for the grasped object relative to a sensor in the operating environment of the robot;
    moving, by the robot, the object to have the show pose in the operating environment;
    determining, using sensor data captured of the object in the show pose, a refined in-hand state for the grasped object representing a refined pose of the grasped object relative to the end effector of the robot;
    determining a placement plan based on the refined in-hand state of the grasped object; and
    providing one or more commands to the robot that cause the robot to place the grasped object according to the refined in-hand state of the grasped object.

13. The system of claim 12, wherein determining the initial in-hand state for the grasped object comprises determining an initial estimate of the in-hand state of a to-be-grasped object based on the object's to-be-grasped state.

14. The system of claim 12, wherein determining the initial in-hand state for the grasped object comprises using a predetermined in-hand state.

15. The system of claim 12, wherein determining the show pose for the grasped object comprises determining the show pose based on the initial in-hand pose.

16. The system of claim 12, wherein determining the show pose for the grasped object comprises determining the show pose for a particular vision algorithm.

17. The system of claim 12, wherein determining the refined in-hand state comprises determining a refined in-hand pose using validation measurements captured at the show pose.

18. The system of claim 12, wherein determining the refined in-hand state comprises capturing the sensor data of the object at the show pose and using a machine learning model to generate a refined in-hand pose.

19. The system of claim 12, further comprising executing the placement plan based on a comparison between the initial in-hand pose and the refined in-hand pose.

20. A computer storage medium encoded with a computer program, the program comprising instructions that are operable, when executed by data processing apparatus in communication with a robot, to cause the data processing apparatus to perform operations comprising:
    providing one or more commands to the robot that cause the robot to grasp an object by an end effector of the robot;
    determining an initial in-hand state for the grasped object representing an initial pose of the grasped object relative to the end effector of the robot grasping the grasped object;
    determining a show pose for the grasped object relative to a sensor in the operating environment of the robot;
    moving, by the robot, the object to have the show pose in the operating environment;
    determining, using sensor data captured of the object in the show pose, a refined in-hand state for the grasped object representing a refined pose of the grasped object relative to the end effector of the robot;
    determining a placement plan based on the refined in-hand state of the grasped object; and
    providing one or more commands to the robot that cause the robot to place the grasped object according to the refined in-hand state of the grasped object.

* * * * *